United States Patent
Landy et al.

(10) Patent No.: US 12,259,727 B2
(45) Date of Patent: Mar. 25, 2025

(54) MULTIPLE DESTINATION TRIPS FOR AUTONOMOUS VEHICLES

(71) Applicant: Waymo LLC, Mountain View, CA (US)

(72) Inventors: Cristi Landy, Sunnyvale, CA (US);
Julien Mercay, Redwood City, CA (US); Saksiri Tanphaichitr, Palo Alto, CA (US); Laurens Andreas Feenstra, San Francisco, CA (US); Salil Pandit, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/209,600

(22) Filed: Jun. 14, 2023

(65) Prior Publication Data

US 2023/0393575 A1   Dec. 7, 2023

Related U.S. Application Data

(63) Continuation of application No. 17/101,279, filed on Nov. 23, 2020, now Pat. No. 11,714,412, which is a
(Continued)

(51) Int. Cl.
*G05D 1/00* (2024.01)
*G08G 1/00* (2006.01)
*G08G 1/02* (2006.01)

(52) U.S. Cl.
CPC ......... *G05D 1/0088* (2013.01); *G05D 1/0291* (2013.01); *G08G 1/20* (2013.01)

(58) Field of Classification Search
CPC .... G05D 1/0088; G05D 1/0291; G08G 1/005; G08G 1/20; G08G 1/202; H04W 4/44;
(Continued)

(56) References Cited

U.S. PATENT DOCUMENTS 9,910,438 B1   3/2018   Arden et al.
9,996,086 B2   6/2018   Templeton
(Continued)

FOREIGN PATENT DOCUMENTS

CN   106779190 A   5/2017
CN   108833147 A   11/2018
(Continued)

OTHER PUBLICATIONS

The Second Office Action for Chinese Patent Application No. 201980083037.6, Apr. 11, 2024, 22 Pages.
(Continued)

*Primary Examiner* — Tyler J Lee
(74) *Attorney, Agent, or Firm* — Botos Churchill IP Law

(57) ABSTRACT

Aspects of the disclosure relate to a method of managing a fleet of autonomous vehicles providing trip services. The method includes receiving information identifying an intermediate destination and a final destination for a trip. In this example, the intermediate destination is a destination where an autonomous vehicle will drop off and wait for a passenger in order to continue the trip, and the final destination is a destination where the trip ends. The method also includes determining an amount of waiting time the vehicle is likely to be waiting for the passenger at the intermediate destination, determining how a vehicle of the fleet of autonomous vehicles should spend the amount of waiting time, and sending an instruction to the vehicle, based on the determination of how the vehicle should spend the amount of waiting time.

20 Claims, 11 Drawing Sheets

Related U.S. Application Data continuation of application No. 16/217,805, filed on Dec. 12, 2018, now Pat. No. 10,877,479.

(58) Field of Classification Search
CPC ... G06Q 10/06315; G06Q 10/20; G06Q 50/40
See application file for complete search history.

(56) References Cited

U.S. PATENT DOCUMENTS

| | | | | |
|---|---|---|---|---|
| 10,086,782 | B1* | 10/2018 | Konrardy | B60W 30/16 |
| 10,137,829 | B2 | 11/2018 | Salter et al. | |
| 10,139,824 | B2 | 11/2018 | Sako et al. | |
| 10,303,181 | B1 | 5/2019 | Wengreen et al. | |
| 10,359,783 | B2* | 7/2019 | Williams | G05D 1/0293 |
| 10,942,520 | B1* | 3/2021 | Copeland | G01C 21/343 |
| 11,100,729 | B2 | 8/2021 | Tojima et al. | |
| 11,373,521 | B2 | 6/2022 | Morris | |
| 2004/0107110 | A1 | 6/2004 | Gottlieb et al. | |
| 2012/0233077 | A1* | 9/2012 | Tate, Jr. | G06Q 10/20 |
| | | | | 705/65 |
| 2013/0073327 | A1 | 3/2013 | Edelberg | |
| 2013/0231824 | A1 | 9/2013 | Wilson et al. | |
| 2013/0317884 | A1 | 11/2013 | Chidlovskii | |
| 2015/0199619 | A1 | 7/2015 | Ichinose et al. | |
| 2015/0233719 | A1 | 8/2015 | Cudak et al. | |
| 2017/0123423 | A1 | 5/2017 | Sako et al. | |
| 2017/0217319 | A1* | 8/2017 | Araki | B60L 53/122 |
| 2017/0235305 | A1 | 8/2017 | Jung et al. | |
| 2017/0370734 | A1 | 12/2017 | Colijn et al. | |
| 2018/0099609 | A1 | 4/2018 | Salter et al. | |
| 2018/0164818 | A1 | 6/2018 | Wilkinson et al. | |
| 2018/0224866 | A1 | 8/2018 | Alonso-Mora et al. | |
| 2018/0225734 | A1 | 8/2018 | Towal | |
| 2018/0239343 | A1 | 8/2018 | Voorhies et al. | |
| 2018/0259976 | A1* | 9/2018 | Williams | G05D 1/223 |
| 2018/0321674 | A1 | 11/2018 | Chase et al. | |
| 2018/0335777 | A1 | 11/2018 | Gibbs et al. | |
| 2019/0012625 | A1 | 1/2019 | Lawrenson et al. | |
| 2019/0035044 | A1* | 1/2019 | Ferguson | G06Q 10/0837 |
| 2019/0051064 | A1 | 2/2019 | Tojima et al. | |
| 2019/0056751 | A1 | 2/2019 | Ferguson et al. | |
| 2019/0137290 | A1 | 5/2019 | Levy et al. | |
| 2019/0163204 | A1 | 5/2019 | Bai et al. | |
| 2019/0171209 | A1* | 6/2019 | Lee | G08G 1/143 |
| 2019/0205842 | A1 | 7/2019 | Starns | |
| 2019/0212725 | A1 | 7/2019 | Woodrow et al. | |
| 2019/0228375 | A1* | 7/2019 | Laury | G05D 1/0088 |
| 2019/0265703 | A1 | 8/2019 | Hicok et al. | |
| 2020/0026279 | A1* | 1/2020 | Rhodes | G01C 21/3697 |
| 2020/0042015 | A1* | 2/2020 | Dickens | G08G 1/202 |
| 2020/0133268 | A1* | 4/2020 | Walsh | G01C 21/3664 |
| 2020/0193812 | A1 | 6/2020 | Morris | |
| 2021/0107509 | A1 | 4/2021 | Hirose et al. | |

FOREIGN PATENT DOCUMENTS

| | | |
|---|---|---|
| JP | 2005179024 A | 7/2005 |
| JP | 2012048563 A | 3/2012 |
| JP | 2015092327 A | 5/2015 |
| JP | 2017136977 A | 8/2017 |
| JP | 2017220090 A | 12/2017 |
| JP | 2018160270 A | 10/2018 |
| JP | 2018173977 A | 11/2018 |
| JP | 2019109165 A | 7/2019 |
| WO | 2017068589 A1 | 4/2017 |
| WO | 2019163186 A1 | 8/2019 |

OTHER PUBLICATIONS

Decision to Grant a Patent for Japanese Patent Application No. 2021-525595, Feb. 20, 2023.
International Search Report and Written Opinion for Application No. PCT/US2019/063571 dated Apr. 2, 2020.
Notice of Reasons for Rejection for Japanese Patent Application No. 2021-525595, Jul. 28, 2022.
Office Action for Singapore Patent Application No. 11202105087R, Sep. 16, 2022.

* cited by examiner

MULTIPLE DESTINATION TRIPS FOR AUTONOMOUS VEHICLES

CROSS REFERENCE TO RELATED APPLICATIONS

The present application is a continuation of U.S. patent application Ser. No. 17/101,279, filed Nov. 23, 2020, which is a continuation of U.S. patent application Ser. No. 16/217,805, filed Dec. 12, 2018, now issued as U.S. Pat. No. 10,877,479, the disclosure of which is incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Thus, such vehicles may be used to provide transportation services. Other systems which provide transportation services typically include drivers or conductors who are tasked with making decisions about how to operate vehicles. Such services may include some backend server systems which can dispatch vehicles to certain locations to provide transportations services as well as provide fleet management and vehicle staging instructions.

BRIEF SUMMARY

One aspect of the disclosure provides a method of managing a fleet of autonomous vehicles providing trip services. The method includes receiving, by one or more computing devices, information identifying an intermediate destination and a final destination for a trip, wherein the intermediate destination is a destination where an autonomous vehicle will drop off and wait for a passenger to return to the vehicle in order to continue the trip and the final destination is a destination where the trip ends; determining, by the one or more computing devices, an amount of waiting time the vehicle is likely to be waiting for the passenger at the intermediate destination; determining, by the one or more computing devices, how a vehicle of the fleet of autonomous vehicles should spend the amount of waiting time; and sending, by the one or more computing devices, an instruction to the vehicle, based on the determination of how the vehicle should spend the amount of waiting time.

In one example, the method also includes receiving second information indicating how long the passenger expects to spend at the intermediate destination, and determining how the vehicle should spend the determined amount of waiting time is further based on the second information. In another example, determining the amount of waiting time is based on a plurality of factors including historical waiting time data associated with the intermediate destination. In another example, determining the amount of waiting time is based on a plurality of factors including historical waiting time data associated with time spent by the passenger at a location of a same type as the intermediate destination. In another example, determining the amount of waiting time is based on a plurality of factors including historical waiting time data associated with time spent by other passengers at the intermediate destination, the other passengers having a characteristic in common with the passenger. In another example, determining the amount of waiting time is based on a plurality of factors including whether the trip includes picking up or dropping off a second passenger at the intermediate destination. In another example, determining the amount of waiting time is based on a plurality of factors including whether the trip includes picking up or dropping off of cargo at the intermediate destination. In another example, determining the amount of waiting time is based on a plurality of factors including a number of passengers for the trip. In another example, determining the amount of waiting time is based on a plurality of factors including third party data indicating time spent by other people at a location associated with the intermediate destination. In another example, determining the amount of waiting time is based on a plurality of factors including third party data indicating time spent by other people at a location of a same type as the intermediate destination. In another example, determining the amount of waiting time is based on determining an amount of time for each of a plurality of factors and taking an average of any determined amounts of time. In another example, determining the amount of waiting time is based on a plurality of factors each associated with a weight indicating a confidence in an estimation of an amount of time for that factor, and taking an average of the amounts of time for the plurality of factors using the weights. In another example, determining how the vehicle should spend the determined amount of waiting time is based on a monetary cost for parking the vehicle during the waiting time. In another example, determining how the vehicle should spend the determined amount of waiting time is based on a hierarchy of preferences including different activities. In this example, the hierarchy of preferences includes a preference for addressing a maintenance need of the vehicle, the place of the preference in the hierarchy depending upon a level of urgency of the maintenance issue. In addition or alternatively, the hierarchy of preferences includes a preference for scheduling the vehicle for another trip of a predetermined duration. In this example, the place in the hierarchy of the preference for scheduling the vehicle for another trip is below another preference for addressing a maintenance need of the vehicle. In another example, determining how the vehicle should spend the determined amount of waiting time is based on whether a second trip estimated to take less than a first threshold period of time is available. In this example, determining how the vehicle should spend the determined amount of waiting time is based on whether the second trip would allow the vehicle to reach the intermediate destination again, after completing the second trip, within a buffer period of the determined amount of waiting time before the passenger is expected to return to the vehicle at the intermediate destination. In addition, the buffer period is determined based on a confidence in the determined amount of waiting time.

DETAILED DESCRIPTION

Overview

Figure 1:
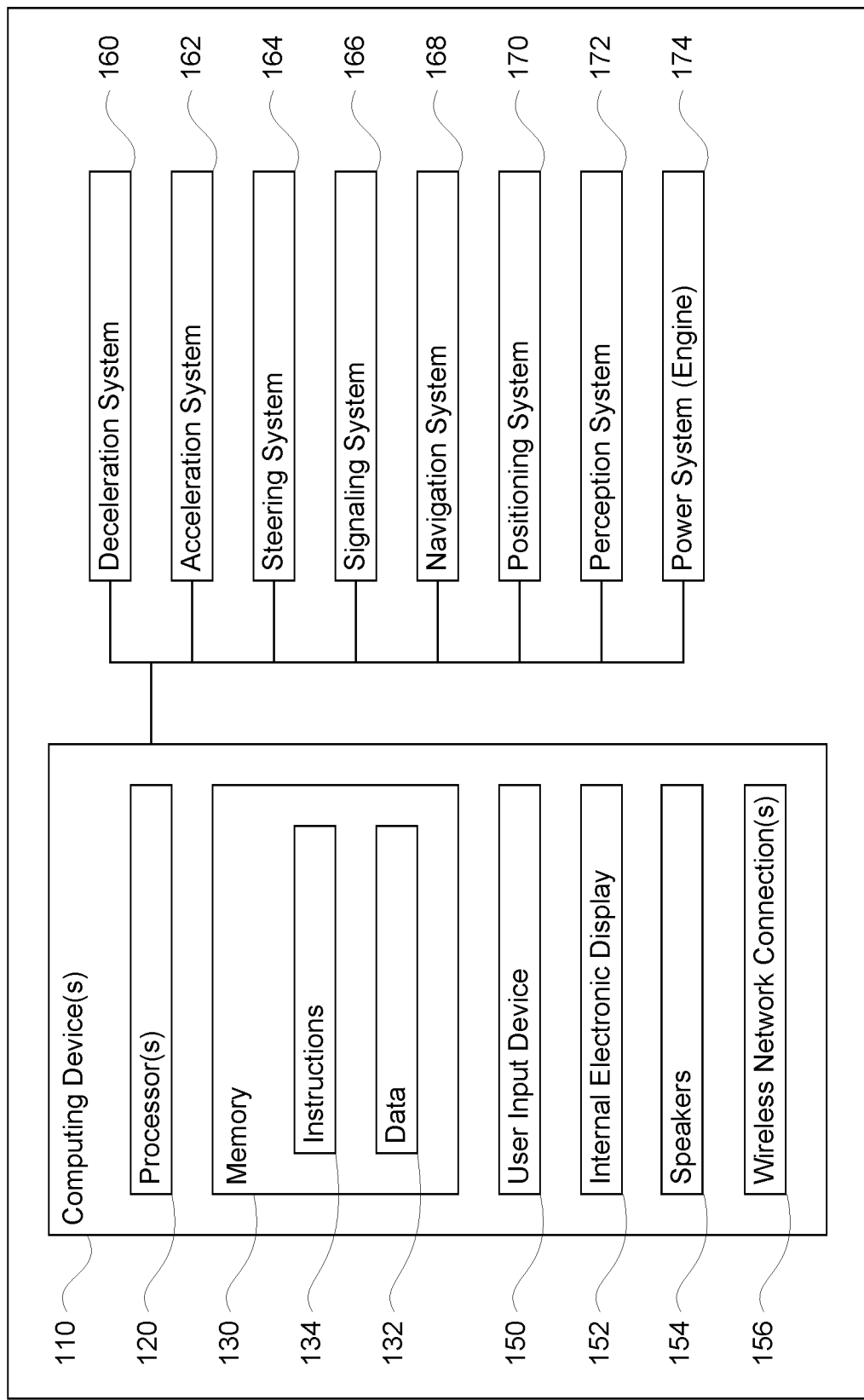
FIG. 1 is a functional diagram of an example vehicle in accordance with an exemplary embodiment.

The technology relates to accommodating trips with multiple destinations or "stops" for autonomous vehicles. Short stops may include those that allow a passenger to get out and get back in and/or include picking up or dropping off an additional passenger while the vehicle waits for the passenger to return in order to continue the trip. This is an especially important feature to be able to provide to customers of a ride service or ride-sharing service. Of course, having a vehicle wait for extended period of time can be a waste of vehicle time which can become fairly significant as the number of vehicles and rides or trips serviced by a fleet of autonomous vehicles increases.

In order to facilitate multiple destination trips, or short stops, a passenger, either before or after entering a vehicle may identify a final destination as well as one or more intermediate destinations. In addition, in some instances, the passenger may also specify how long the passenger expects to spend at each of the one or more intermediate destinations. This information may be sent to one or more server computing devices of a fleet management system for managing a fleet of autonomous vehicles.

For each of these one or more intermediate destinations, the fleet management may determine how long the vehicle is likely to be waiting for the passenger to return in order to continue the trip. This amount of waiting time may be based on the information indicating the same from the passenger, if available, and/or a number of other factors. Once an amount of time for an intermediate destination has been determined, the fleet management system may determine how the vehicle should spend that amount of time. In order to do so, the fleet management system may attempt to optimize for the vehicle servicing other trips. This may also require the vehicle staying in close proximity to the intermediate destination such that the vehicle is likely to be close by when the passenger is actually ready to be picked up. For instance, the fleet management system may follow a hierarchy of preferences for what a vehicle should do. As one example, the hierarchy of preferences may start by having the fleet management system attempt to resolve any outstanding urgent maintenance needs for the vehicle. Once any urgent maintenance needs are addressed, the fleet management system may determine whether the vehicle is able to be assigned to a short duration trip. If the maintenance required is less urgent, for instance a periodic cleaning, the fleet management system may simply determine whether the vehicle is able to be assigned to a short duration trip rather than assigning the vehicle to the maintenance location.

If a short duration trip, is being requested by another passenger in the area and the amount of time for the intermediate destination is at least some threshold amount of time greater than an estimated time for the short duration trip, the fleet management system may assign the vehicle to the short duration trip. The threshold amount of time may be determined based on an amount of time for the vehicle to return to the intermediate destination after the short duration trip has ended plus an additional buffer period of time. During this short duration trip and/or afterwards, the fleet management system may continuously attempt to assign the vehicle to future short duration trips if possible given the time remaining in the determined amount of time after the short duration trip is completed.

Of course, short duration trips may not always be available. If not, the fleet management system may determine whether a longer duration trip is being requested by another passenger in the area and the amount of time for the intermediate destination is at least some threshold amount of time greater than an estimated time for the long duration trip. If so, the fleet management system may assign the vehicle to the long duration trip. Again, this threshold amount of time may be determined based on an amount of time for the vehicle to return to the intermediate destination after the long duration trip has ended plus an additional buffer period of time. During this long duration trip and/or afterwards, the fleet management system may continuously attempt follow the hierarchy of preferences in order to resolve maintenance needs as well as assign the vehicle to future short or long duration trips if possible given the time remaining in the determined amount of time after the long duration trip is estimated to be completed.

After each short or long duration trip and/or a short or long duration trip is not available, the fleet management system may again determine whether the vehicle needs some type of maintenance. When the maintenance has been completed and/or if no maintenance is required, the fleet management system may send an instruction to the vehicle to park and wait for the passenger.

Once the passenger is ready to be picked up at the intermediate destination, he or she may use her client computing device to "recall" the vehicle. This may include tapping a button in an application for the ride service which causes the client computing device to send a corresponding request to the fleet management system. In response, if the vehicle is available, the fleet management system may send instruction to the vehicle to return to the intermediate destination, pick up the passenger, and complete the trip.

The features described here allow an autonomous vehicle service to accommodate trips with multiple destinations. In addition, the fleet management system are able to determine what a vehicle should do while waiting for a passenger at an intermediate destination in a way which allows the fleet management system to reduce the amount of time that a vehicle is spent waiting in an unproductive way. In addition, what the vehicle does may be selected in order to optimize the number of trips serviced while a vehicle would otherwise be waiting and/or for the vehicle to be able to immediately return to pick up a passenger at an intermediate destination when the passenger is ready to be picked up. The features described herein may also allow a passenger to act as a pseudo dispatcher for a vehicle which they may not own, but can be used to pick up and drop of the passenger and/or third parties at the passenger's discretion, without having to worry about a driver or what the vehicle will do when the passenger is at an intermediate destination. Moreover the features described herein may allow for various ownership models which can allow a passenger to effectively take a vehicle in an out of service based on how long a passenger will not require the vehicle.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
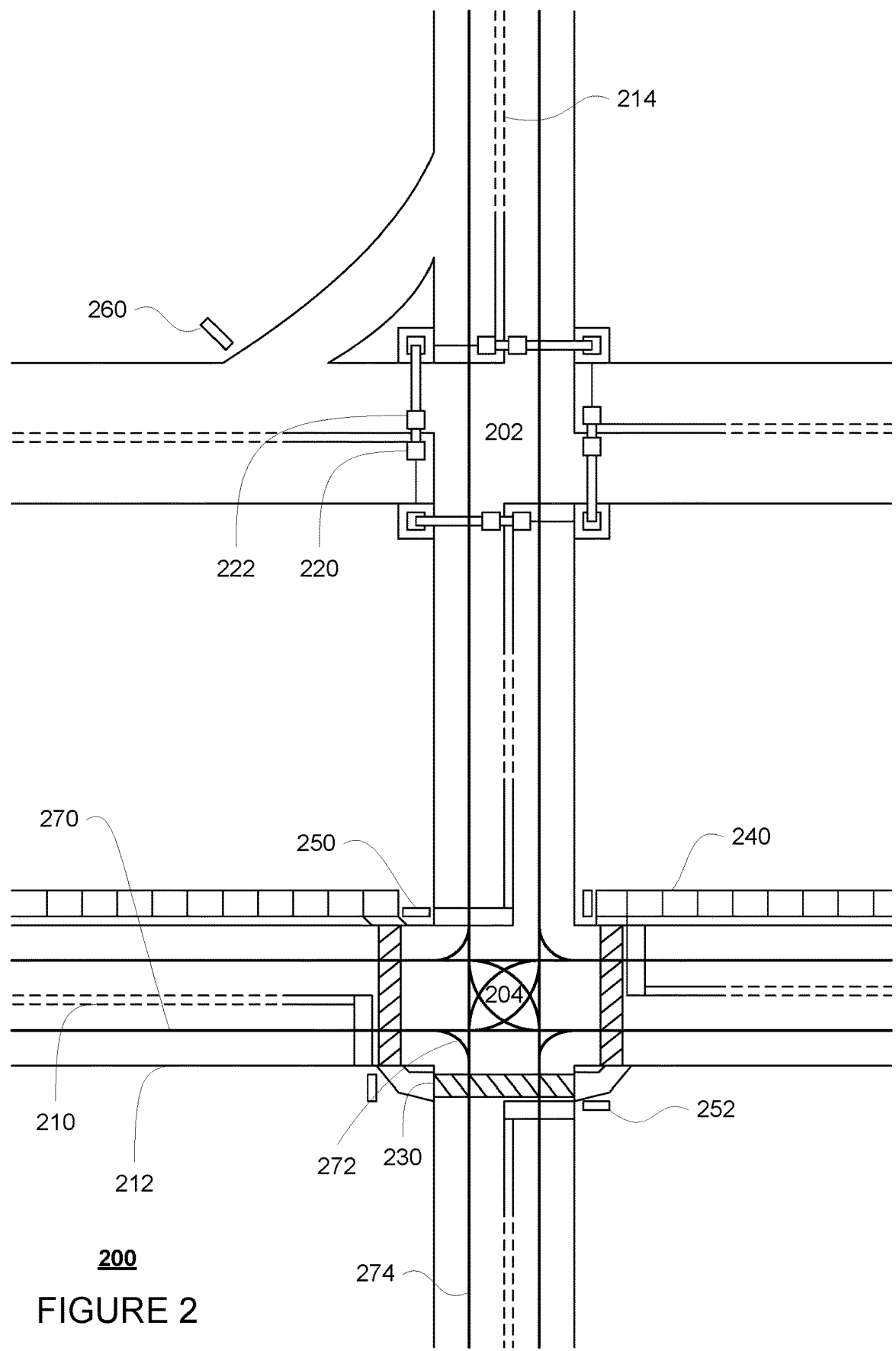
FIG. 2 is an example of map information in accordance with aspects of the disclosure.

FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. Areas where the vehicle can drive may be associated with one or more rails 270, 272, and 274 which indicate the location and direction in which a vehicle should generally travel at various locations in the map information. For example, a vehicle may follow rail 270 when driving in the lane between lane lines 210 and 212, and may transition to rail 272 in order to make a right turn at intersection 204. Thereafter the vehicle may follow rail 274. Of course, given the number and nature of the rails only a few are depicted in map information 200 for simplicity and ease of understanding.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
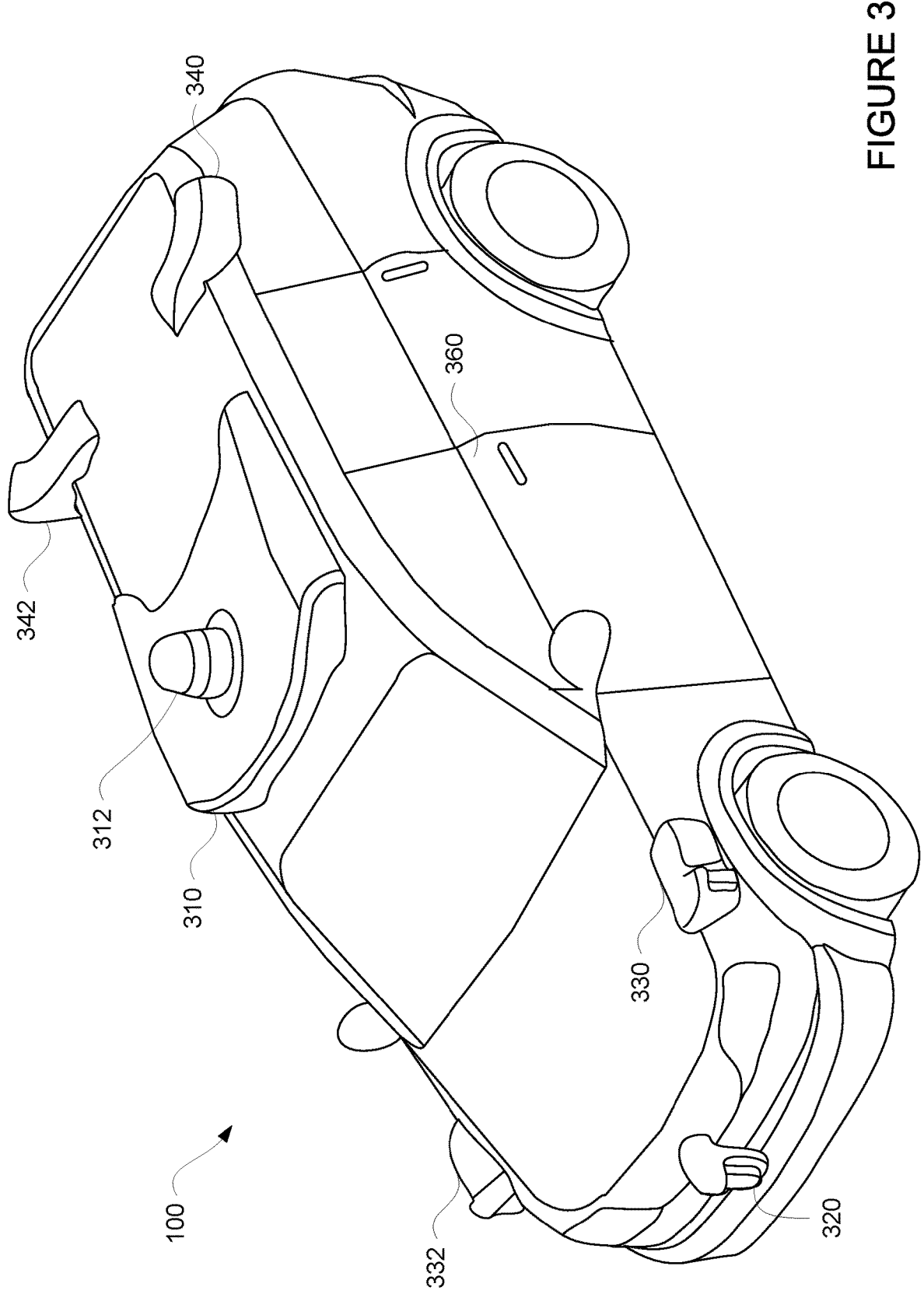
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a lidar sensor as well as various cameras and radar units. In addition, housing 320 located at the front end of vehicle 100 and housings 330, 332 on the driver's and passenger's sides of the vehicle may each store a lidar sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may control the direction and speed of the vehicle by controlling various components. By way of example, computing devices 110 may navigate the vehicle to a destination location completely autonomously using data from the detailed map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
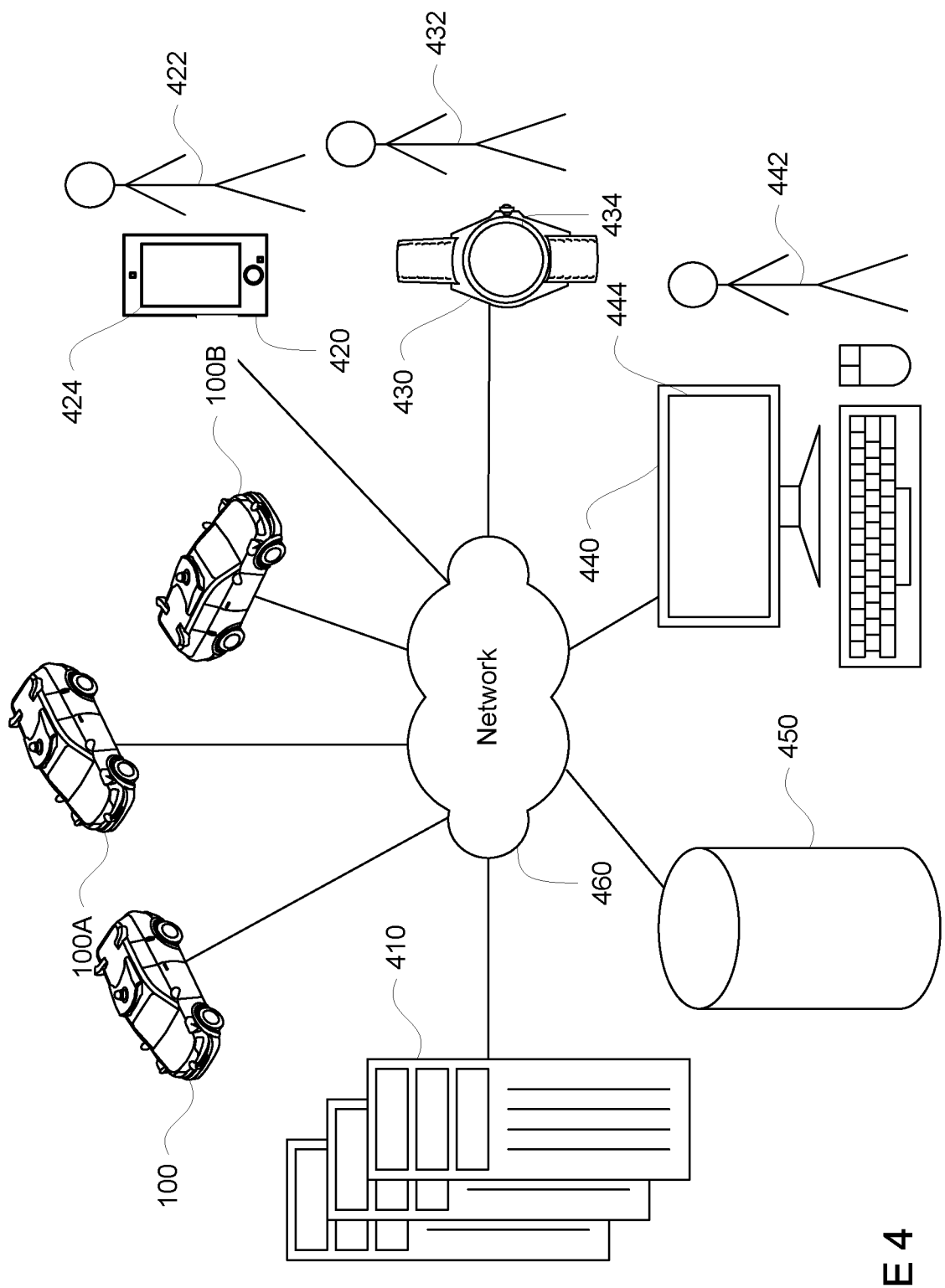
FIG. 4 is a pictorial diagram of an example system in accordance with an exemplary embodiment.
Figure 5:
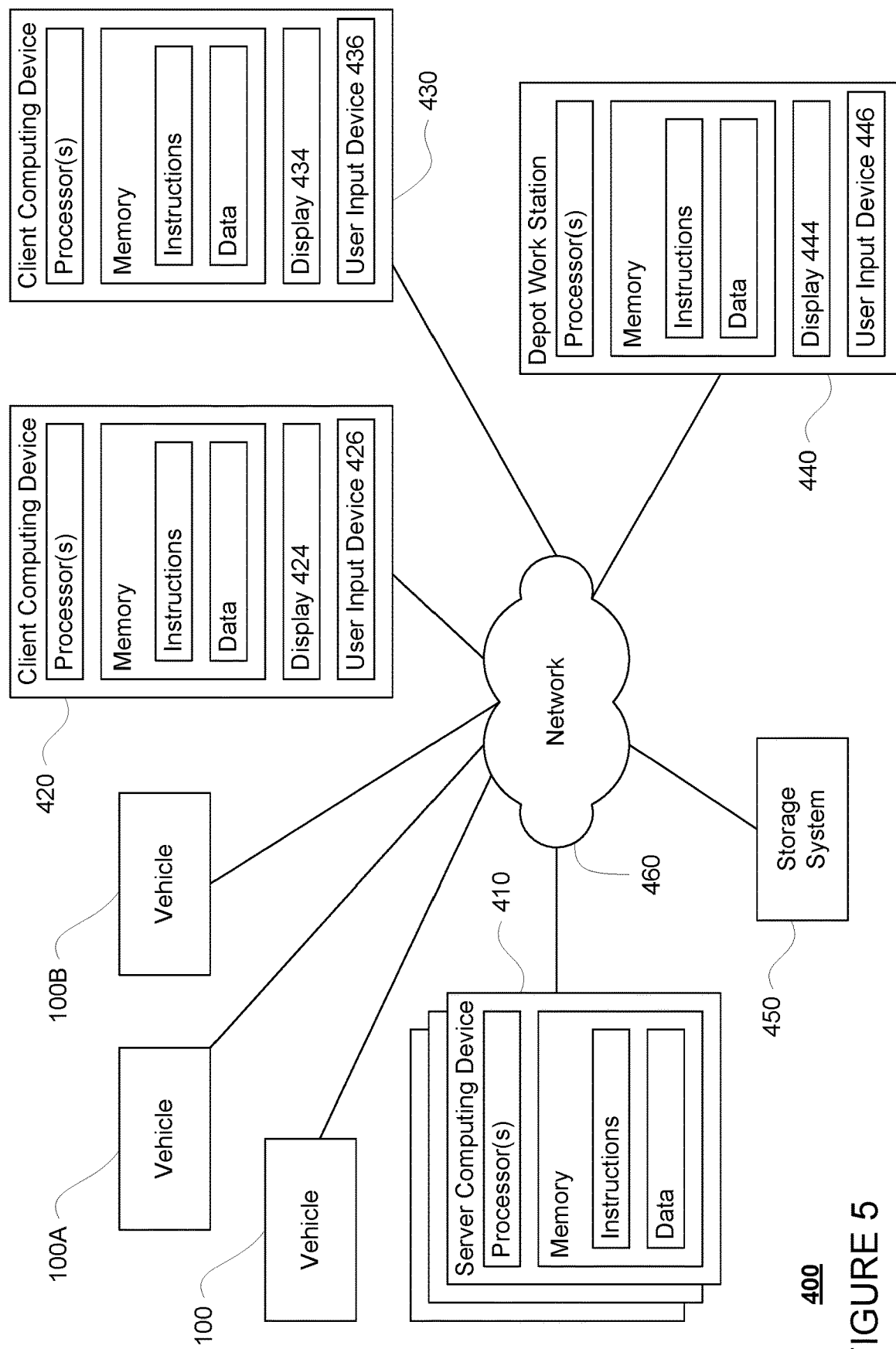
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A, 100B as well as computing devices 420, 430, 440 via the network 460. For example, vehicles 100, 100A, 100B may be a part of a fleet of vehicles that can be dispatched by server computing devices to various locations. In this regard, the server computing devices 410 may function as a fleet management system (hereafter, fleet management system 410). In addition, as discussed further below, the vehicles of the fleet may periodically send the fleet management system location information provided by the vehicle's respective positioning systems as well as other information relating to the status of the vehicles discussed further below, and the fleet management system may track the locations and status of each of the vehicles of the fleet.

In addition, the fleet management system 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server computing device (such as the server computing devices of the fleet management system 410) over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 5. As an example the user may input information using a small keyboard, a keypad, microphone, using visual signals with a camera, or a touch screen.

As with memory 130, storage system 450 can be of any type of computerized storage capable of storing information accessible by the fleet management system 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as those of the fleet management system 410, in order to perform some or all of the features described herein. For instance, the storage system 450 may also store a hierarchy of preferences for what a vehicle should do.

In addition, the information of storage system 450 may include the status and characteristics of each vehicle of the fleet, as discussed above, as well as the map information discussed above. As the vehicles of the fleet drive around, they may constantly and/or periodically broadcast to the fleet management system 410 their status. This may include, for example, whether the vehicle is currently on a trip (e.g. is transporting passengers and/or cargo), a current destination of the vehicle and/or one or more additional future destinations for the vehicle (as discussed further below), whether the vehicle has any maintenance needs, etc. As an example, maintenance needs may include whether the vehicle needs cooling or shade, refueling or charging, cleaning, periodic inspection (after so many hours, trips, or miles in service), recalibration of sensors (to address faults or periodic maintenance), or other maintenance. The fleet management system 410 may store his information in storage system 450.

In order to provide transportation services to users, the information of storage system 450 may include user account information such as credentials (e.g., identifiers such as a username and password as in the case of a traditional single-factor authentication as well as other types of credentials typically used in multi-factor authentications such as random identifiers, biometrics, etc.) that can be used to identify a user to the fleet management system. The user account information may also include personal information such as the user's name, contact information, identifying information of the user's client computing device (or devices if multiple devices are used with the same user account), one or more unique signals for the user as well as other user preference or settings data.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As noted above, the vehicles of the fleet drive around, they may constantly report to the fleet management system their status. For instance, each vehicle's positioning system 170 may provide the vehicle's computing device 110 with the vehicle's location and position. The computing devices 110 may then send this information to the fleet management system 410 as status messages. In addition to the vehicle's location, the different systems of the vehicle may also send information to the computing devices 110. This may include, for example, whether the vehicle needs cooling or shade, refueling or charging, cleaning, periodic inspection (after so many hours, trips, or miles in service), recalibration of sensors (to address faults or periodic maintenance), or other maintenance. This may also be sent to the fleet management system 410 in the status messages or other messages.

Figure 6:
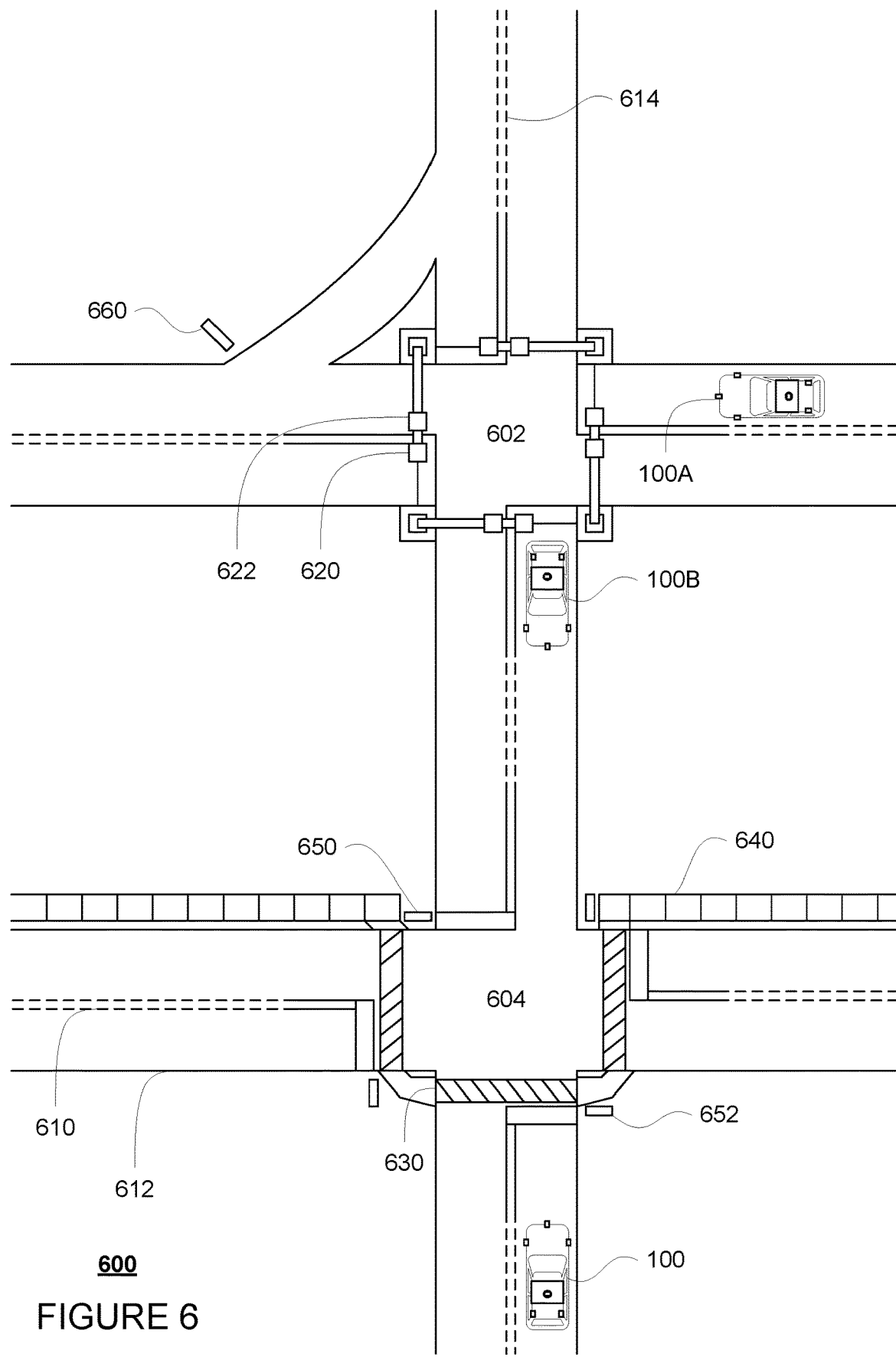
FIG. 6 is an example bird's eye view of a geographic area in accordance with aspects of the disclosure.

As noted above, the fleet management system 410 may receive the status messages and track the status of each vehicle in storage system 450. For instance, FIG. 6 depicts vehicles 100, 100A, and 110B being maneuvered on a section of roadway 600 including intersections 602 and 604. In example of FIG. 6, intersections 602 and 604 correspond to intersections 202 and 204 of the map information 200, respectively. In this example, lane lines 610, 612, and 614 correspond to the shape, location, and other characteristics of lane lines 210, 212, and 214, respectively. Similarly, crosswalk 630 corresponds to the shape, location, and other characteristics of crosswalk 230, respectively; sidewalks 640 correspond to sidewalks 240; traffic signal lights 620, 622 correspond to traffic signal lights 220, 222, respectively; stop signs 650, 652 correspond to stop signs 250, 252, respectively; and yield sign 660 corresponds to yield sign 260.

Figure 7:
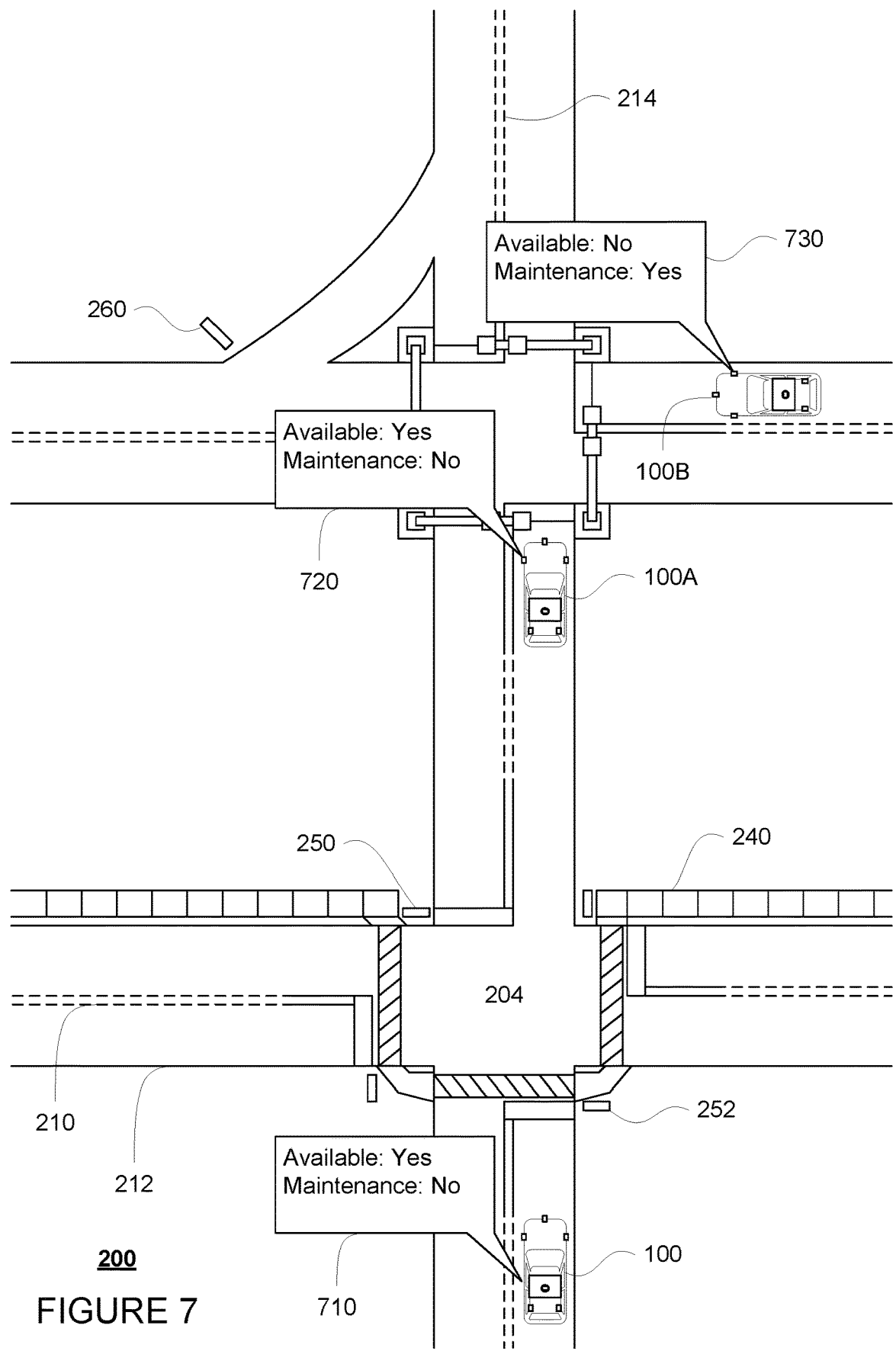
FIG. 7 is an example representation of data in accordance with aspects of the disclosure.

FIG. 7, is an example of status messages 710, 720, 730 for each of vehicles 100, 100A, 100B, respectively. In this example, vehicle 100 is available for a trip, vehicle 100B is not available for a trip (for instance, vehicle 100B may be occupied by passengers and/or cargo), and vehicle 100A is available for a trip. However, vehicle 100 may be "completely available" and vehicle 100A may only be available for a certain period of time. This may be determined, for instance, by the fleet management system 410 as discussed further below. In addition, the messages 710, 720, 730 also indicate that vehicles 100 and 100A do not have maintenance needs while vehicle 100B has a maintenance need. Although not shown for simplicity, the messages may also indicate other information, such as a current destination of the vehicle, a last message received by the vehicle from the fleet management system, etc.

The fleet management system 410 may use these status messages to update the storage system 450. Thus, the fleet management system 410 may track the status of each vehicle over time. In addition to using the status messages, the fleet management system 410 may also track information such as the number of hours each vehicle has been in service or out of service, the number of hours since the vehicle was inspected, the number of hours since the vehicle's sensors were calibrated, and so on.

In order to request a vehicle, a user may download an application for requesting transportation services, or rather a vehicle, to a client computing device. For example, users 422 and 432 may download the application via a link in an email, directly from a website, or an application store to client computing devices 420 and 430. For example, client computing device may transmit a request for the application over the network, for example, to one or more fleet management system 410 110, and in response, receive the application. The application may be installed locally at the client computing device.

The user may then use his or her client computing device to access the application and request a vehicle. As an example, a user such as user 432 may use client computing device 430 to send a request to fleet management system 410 for a vehicle. As part of this, the user may identify a pickup location and a destination location. In order to facilitate multiple destination trips, or short stops, a passenger, either before or after entering a vehicle, the user (now considered a passenger), may identify a final destination as well as one or more intermediate destinations.

Figure 8:
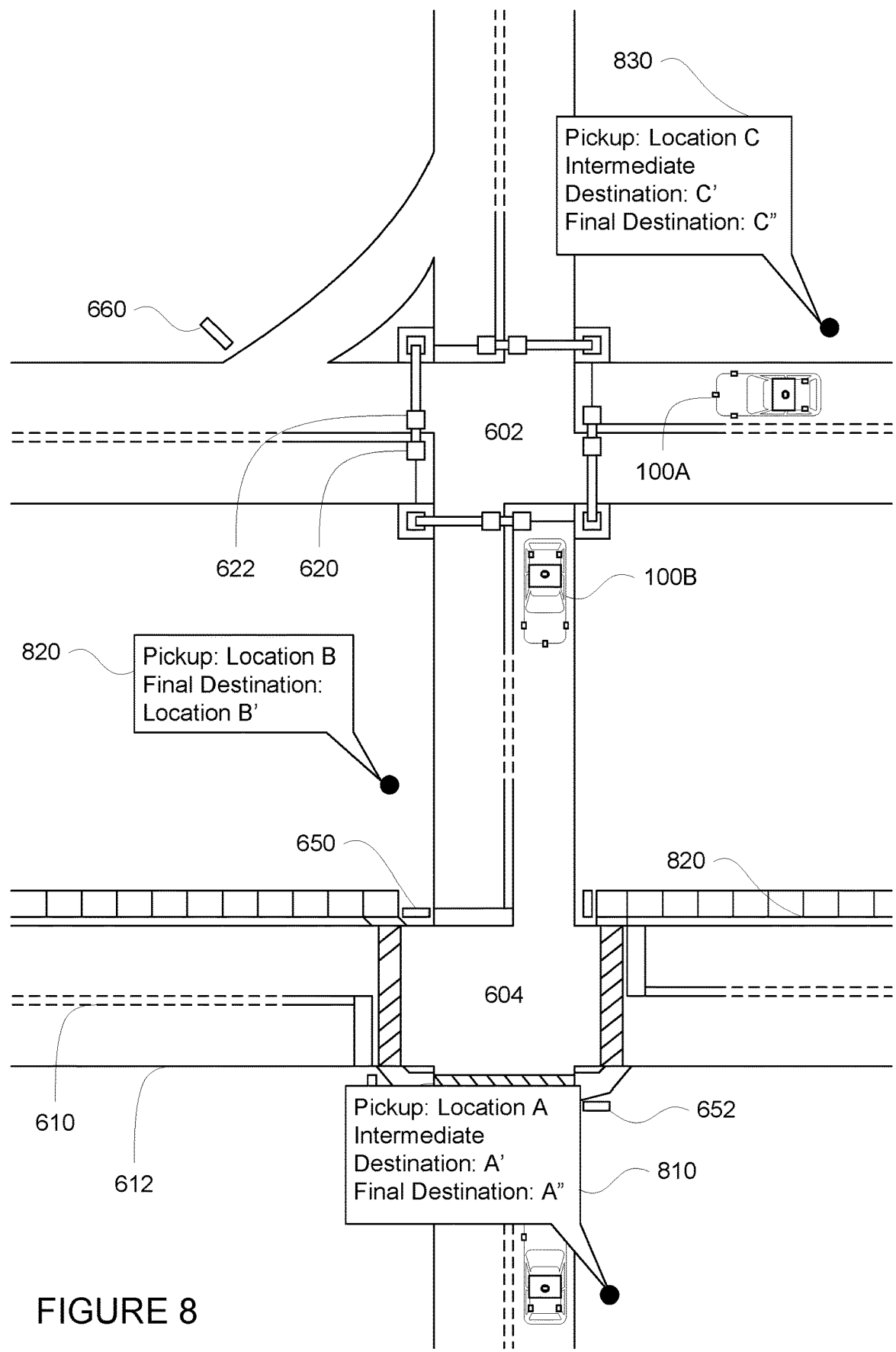
FIG. 8 is an example representation of data in accordance with aspects of the disclosure.

For instance, FIG. 8 provides an example of "current" requests 810, 820, 830 for vehicles at some point close in time to the example of FIGS. 6 and 7. In this example, each request may identify a passenger (for instance, by identification number), a pickup location, and a destination location. In the examples of request 810 and 830, the passengers have also identified one or more intermediate destinations.

Figure 9:
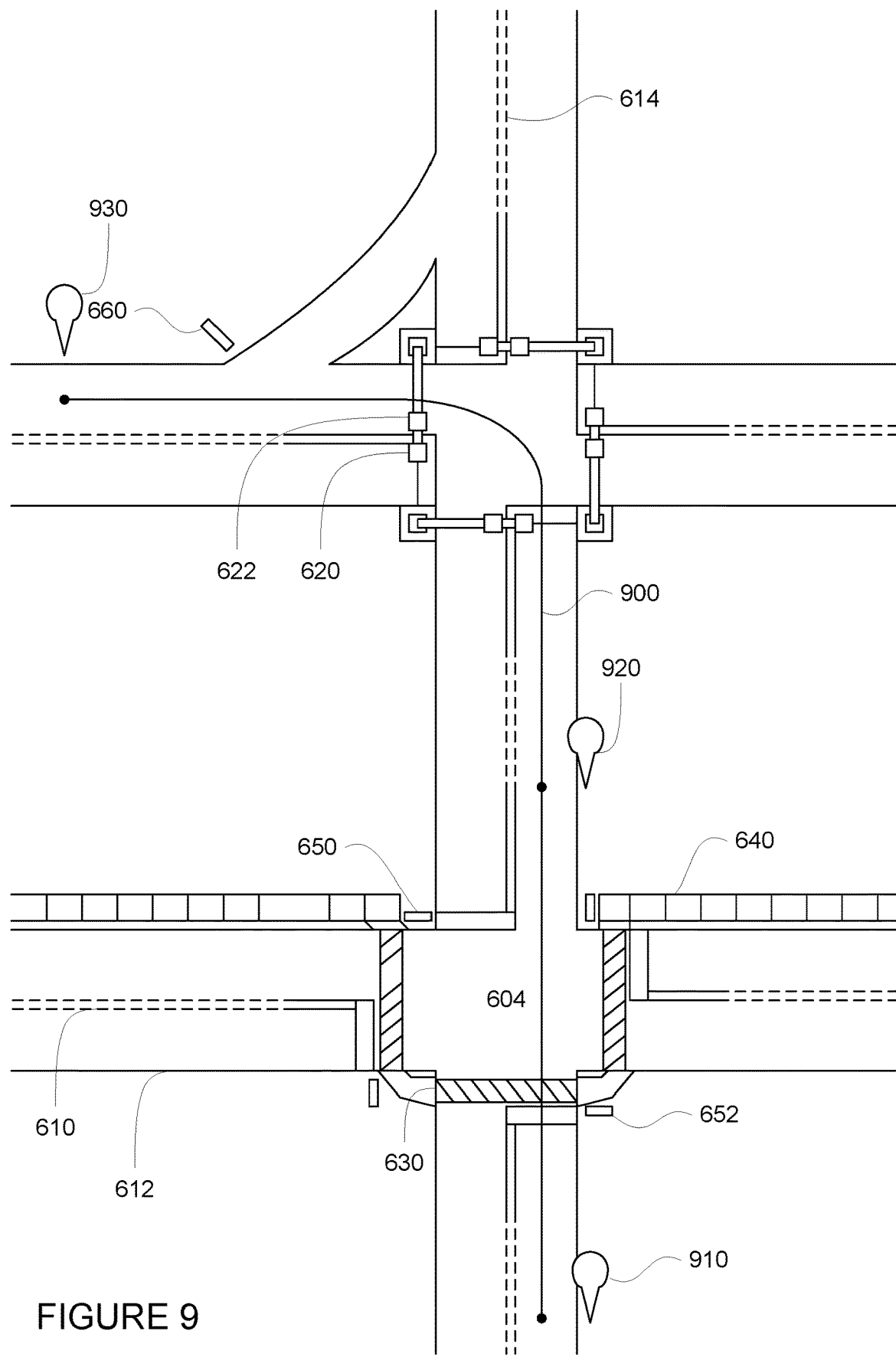
FIG. 9 is an example representation of data in accordance with aspects of the disclosure.

FIG. 9 provides an example of location for a trip 900 for a passenger, such as the passenger who made request 810. Trip 900 includes a pick up location 910 for the passenger corresponding to location A (this may be for example, the current location of the passenger and/or the passenger's client computing device), an intermediate destination 920 for the passenger corresponding to location A', and a final destination 930 for the passenger corresponding to location A". This information may have been provided to the fleet management system 410 by the passenger's client computing device, for instance, via network 460.

In response to a request for a vehicle, the fleet management system 410 may select a vehicle for the passenger. For instance, the fleet management system 410 may select an available vehicle, such as vehicle 100, to be assigned to the passenger of request 810 based on the information in the storage system 450 regarding the status of each vehicle of the fleet of vehicles. For instance, a vehicle may be selected if it is nearby the passenger, is free to provide transportation services, is not in need of urgent maintenance, etc.

Once selected, the available vehicle may be assigned to the passenger. For instance, the fleet management system 410 may update the status of vehicle 100 in the storage system 450. In addition, the fleet management system 410 may send the pickup location to the computing devices 110 of vehicle 100, for instance, via network 460. The computing devices 110 may also set the pickup location as the "next destination" for the vehicle 100. In addition, the computing devices 110 may also receive the final destination as well as the intermediate destination, and/or this information may be sent to the vehicle's computing devices when the vehicle reaches the pickup location and/or the intermediate destination.

In addition, in some instances, the passenger may also specify how long the passenger expects to spend at each of the one or more intermediate destinations. For instance, the passenger may specify an expected amount of time indicating how long he or she expects to be at a location of intermediate destination 920. This may occur when the passenger specifies the one or more intermediate destinations, when the vehicle reaches each of the one or more intermediate destinations, or at some point there between. In this regard, this information may be entered by the passenger into the passenger's client computing device (for instance, via the application) and/or via a user input of the vehicle, such as user input 150. This information may be sent by the passenger's client computing device and/or the computing devices 110 to the fleet management system 410, again via network 460.

For each of these one or more intermediate destinations, the fleet management system 410 may determine how long the vehicle is likely to be waiting for the passenger to return in order to continue the trip. This amount of waiting time may be based on an expected amount of time provided by the passenger, if available, and/or a plurality of factors. The plurality of factors may include, for instance, historical waiting times, the number of passengers, whether the intermediate destination is merely to pick up or drop off another passenger (e.g., where the ride will continue with one or more other passengers), data from third party sources about how long people (e.g., customers) tend to stay at a location associated with the intermediate destination or other similar location(s) (e.g. a location of the same or similar type), particularly at or around a time of day when the vehicle will be stopped at the intermediate destination (e.g., a grocery store is typically less busy at 11 pm than at 11 am, the amount of time a passenger may spend at a service provider such as a nail salon, hospital, clinic, dental office, etc., may be longer than the amount of time the passenger would spend at a bank or a post office, the amount of time a passenger may spend at a post office may vary depending on the time of day, month or season, and so on), whether the passenger and/or a third party will have to load or unload cargo at the intermediate destination, real time traffic congestion or business of the surroundings (e.g., it could take longer for a passenger to reach the vehicle in a busy parking lot as compared to a less busy parking lot), and more. As examples, historical waiting times may include wait times of the past history of this particular passenger at this particular location or other similar location(s), the past history of similarly situated passengers (i.e., other passengers with the same or similar demographics or characteristics (e.g., infirmity, age, profession, gender, etc.), traveling with children, etc. as the passenger) at this particular location or other similar location(s), past history of all passengers at this particular location or other similar location(s), etc. Real time traffic congestion or business may be obtained from informational services (e.g., third party sources), for instance, by one or more other server computing devices via network 460, from camera or video feeds of the area, etc. In some instances, multiple locations may be associated with an intermediate destination (e.g., a group of shops or service providers, or a cluster of office buildings, sharing a driveway or parking lot), and a passenger may indicate one or more of the locations that the passenger intends to visit at the intermediate destination, which may then be factored into the waiting time amount. In other instances where multiple locations are associated with an intermediate destination, a passenger may specify an expected amount of waiting time, which further may be modifiable by the passenger while the passenger is at the intermediate destination (e.g., if lines are unexpectedly long or short, if the passenger chooses to add more errands at the intermediate destination, or other reasons).

As one example, the fleet management system 410 may estimate an amount of waiting time based on each of the plurality of factors (assuming there is information available for a given factor) and take an average. As another example, each of the plurality of factors may be weighted by a confidence in an estimation for that factor and thereafter take an average. Of course, the larger the standard deviation among the estimated amounts of time for the factors, the lower the confidence in the average amount of time or the determined amount of time for the intermediate destination.

Once an amount of waiting time for an intermediate destination has been determined, the fleet management system 410 may determine how the vehicle should spend that amount of waiting time. In order to do so, the fleet management system may attempt to optimize for the vehicle servicing other trips. This may also require the vehicle staying in close proximity to the intermediate destination such that the vehicle is likely to be close by when the passenger is actually ready to be picked up. For instance, the fleet management system 410 may follow the aforementioned hierarchy of preferences for what a vehicle should do stored in storage system 450.

The hierarchy of preferences may start by having the fleet management system 410 attempt to resolve any outstanding urgent maintenance needs for the vehicle. For instance, the status of the vehicle 100 with regard to maintenance needs may change over time. In this regard, the vehicle 100, though it did not have maintenance needs at the time of the example of FIG. 7, this may no longer be the case once the vehicle is proximate to the intermediate destination. In addition, different maintenance needs may be associated with different levels of urgency. Higher levels or urgency may be correspond urgent maintenance needs which cannot be deferred till a later time, and lower levels of urgency may correspond to less urgent or non-urgent maintenance needs which can be deferred till a later time. If any urgent maintenance needs are resolved and/or can be delayed in resolving, the hierarchy of preferences may then have the fleet management system 410 send the vehicle on one or more short duration trips which do not take the vehicle more than some predetermined distance in time or space from the location of the additional location. If not available or possible given the amount of waiting time, the hierarchy of preferences may have the fleet management system 410 attempt to send the vehicle on one or more long duration trips which do not take the vehicle more than some predetermined distance in time or space from the location of the additional location. If not available or possible given the determined amount of waiting time, the hierarchy of preferences may have the fleet management system 410 again determine whether the vehicle requires maintenance, and if there is enough time, resolve any less urgent maintenance needs. Thereafter, the hierarchy of preferences may cause the fleet management system 410 provide the vehicle with instructions to park and wait.

For instance, the fleet management system 410 may first determine whether the vehicle needs some type of maintenance. This may be determined, for instance, by referring to the status of the vehicle 100 in the storage system 450. If the vehicle does require maintenance, and the maintenance required is urgent (i.e. there is a problem with a critical sensor or the vehicle is running out of fuel and/or electric charge), the fleet management system 410 may next determine whether a maintenance and/or charging location is nearby to the intermediate destination. If so, the fleet management system 410 may assign the vehicle to the maintenance location until the maintenance is completed. In this regard, the vehicle is able to be productive when the vehicle would otherwise be waiting for the passenger to finish at the intermediate destination. The fleet management system 410 110 may send instructions to the vehicle, for instance via network 460, to cause the vehicle to proceed to the maintenance location from the intermediate destination. Again, this may cause the computing devices of the vehicle to set the vehicle's current destination to the maintenance location. This may also be reported back to the fleet management system in the next status message from the vehicle.

Similarly, if the maintenance was previously scheduled and the vehicle has a window during which it can go to a maintenance location, the fleet management system 410 may assign the vehicle to the maintenance location until the maintenance is completed. In another example, if a vehicle requires a charge and there is an opportunity to recharge the vehicle at a nearby high speed charging station and/or the current cost of electricity is low (e.g. charging costs may be lower at different times of day), the fleet management system 410 may assign the vehicle to charging location until the maintenance is completed. In this regard, the vehicle is able to be productive when the vehicle would otherwise be waiting for the passenger to finish at the intermediate destination. Again, the fleet management system 410 may send instructions to the vehicle's computing devices, for instance via network 460, to cause the vehicle to proceed to the maintenance location. Of course, if the charging costs are high and the vehicle is able to service one or more short trips, the fleet management system 410 may defer assigning the vehicle to a charging location.

Once any urgent maintenance is addressed, the fleet management system 410 may determine whether the vehicle is able to be assigned to a short duration trip. In other words, non-urgent maintenance, for instance a periodic cleaning, may be differed in favor of a suitable short duration trip. In such cases, the fleet management system 410 may simply determine whether the vehicle is able to be assigned to a suitable short duration trip rather than assigning the vehicle to the maintenance location. For instance, a short duration trip may be considered suitable if the amount of time for the vehicle to complete the short duration trip a is at least some threshold amount of time less than the determined amount of waiting time. If so, the fleet management system 410 may send an instruction to the vehicle, for instance via network 460, to proceed to perform the short duration trip. As an example, a short duration trip may be a trip that is less than some predetermined period of time, such as 10 minutes or more or less.

Figure 10:
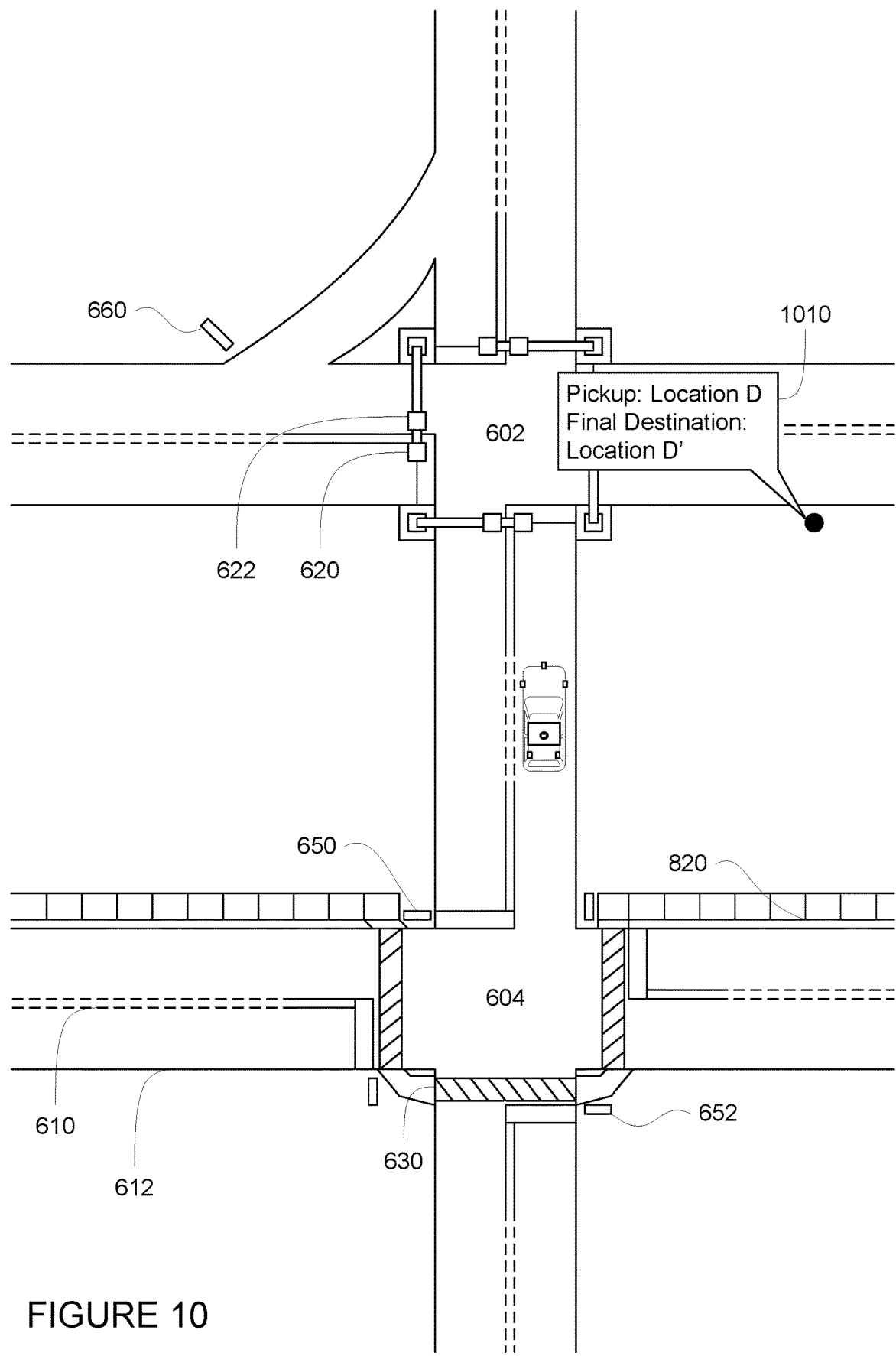
FIG. 10 is an example representation of data in accordance with aspects of the disclosure.

For instance, FIG. 10 provides an example of a "current" request 1010 for a vehicle at some point later in time before or after the vehicle 100 drops off the passenger at the intermediate destination 920. In this example, each request may identify a passenger (for instance, by identification number), a pickup location, and a destination location. For instance, if request 1010 is a short duration trip, the vehicle 100 may be assigned to the passenger of request 1010. In this regard, the vehicle is able to be productive when the vehicle would otherwise be waiting for the passenger to finish at the intermediate destination. The fleet management system 410 may send instructions to the vehicle, for instance via network 460, to cause the vehicle to proceed to perform the short duration trip. Examples of short duration trips may include trips to transport passengers and/or cargo such as an errand, delivery, or pick up for either the passenger or another person could be done during this wait time (e.g. picking up dry cleaning, coffee, or items at a store, etc.).

The threshold amount of time may be determined based on an amount of time for the vehicle to return to the intermediate destination after the short duration trip has ended plus an additional buffer period of time. This buffer period of time may be a fixed period of time, such as 5 minutes or more or less, or may be determined based on the confidence in the determined amount of time. In other words, a larger buffer may be used when the confidence is low, and a smaller buffer may be used when the confidence is high. During this short duration trip and/or afterwards, the fleet management system 410 may continuously attempt to assign the vehicle to future short duration trips if possible given the time remaining in the determined amount of time after the short duration trip is completed.

Of course, short duration trips may not always be available. If not, the fleet management system 410 may determine whether a suitable long duration trip is being requested by another passenger in the area. A long duration trip may be a trip that is greater than some predetermined period of time, such as 10 minutes or more or less. In addition, a long duration trip may be considered suitable if the amount of time for the vehicle to complete the long duration trip is at least some threshold amount of time less than the determined amount of waiting time. Of course, whether a vehicle can service a long duration trip may also be determined by the fleet management system 410 based on the status of the vehicle (e.g. whether the vehicle has enough fuel or battery charge). If so, the fleet management system 410 may assign the vehicle to the long duration trip. For instance, returning to FIG. 10, if request 1010 is a long duration trip, the vehicle 100 may be assigned to the passenger of request 1010. In this regard, the vehicle is able to be productive when the vehicle would otherwise be waiting for the passenger to finish at the intermediate destination. Again, the fleet management system 410 110 may send instructions to the vehicle, for instance via network 460, to cause the vehicle to proceed to perform the long duration trip.

Again, this threshold amount of time may be determined based on an amount of time for the vehicle to return to the intermediate destination after the long duration trip has ended plus an additional buffer period of time. In addition, this buffer period of time may be a fixed period of time, such as 5 minutes or more or less, or may be determined based on the confidence in the determined amount of time. In other words, a larger buffer may be used when the confidence is low, and a smaller buffer may be used when the confidence is high. During this long duration trip and/or afterwards, the fleet management system 410 may continuously attempt follow the hierarchy of preferences in order to resolve maintenance needs as well as assign the vehicle to future short or long duration trips if possible given the time remaining in the determined amount of time after the long duration trip is estimated to be completed.

After each short or long duration trip and/or in the event a short or long duration trip is not available, the fleet management system 410 may again proceed to follow the hierarchy of preferences. This may involve the fleet management system again determining whether the vehicle needs some type of maintenance. If the maintenance required is urgent (i.e. there is a problem with a critical sensor or the vehicle is running out of fuel) and a maintenance location is nearby, the fleet management system 410 may assign the vehicle to the maintenance location until the maintenance is completed. If the maintenance required is less urgent, the fleet management system 410 may determine whether the vehicle is able to be assigned to a maintenance location and have the maintenance completed given the time remaining in the determined amount of time after the maintenance is estimated to be completed. As in the other examples, this may require there being sufficient time remaining such that the vehicle is able to return to the intermediate destination after the maintenance has ended plus an additional buffer period of time. Again, this buffer period of time may be a fixed period of time, such as 5 minutes or more or less, or may be determined based on the confidence in the determined amount of time.

When the maintenance has been completed and/or if no maintenance is required and there are no short or long duration trips suitable for the vehicle, the fleet management system 410 may send an instruction to the vehicle, for instance via network 460, to cause the vehicle to park and wait for the passenger at the intermediate destination. In some instances, the fleet management system 410 may send instructions for the vehicle to park nearby to the location of the intermediate destination, especially if the determined amount of waiting time is very short. If the determined amount of waiting time is longer and/or there are costs (e.g. paid parking) involved with parking close to the location of the intermediate destination, the fleet management system 410 may send instructions for the vehicle to park farther away from the location of the intermediate destination. In some instances, even where there are parking costs, the fleet management system 410 may send instructions to park nearby based on a preference of the passenger (for instance, after prompting the passenger to confirm that he or she is willing to pay or prepay for the parking costs and/or other costs resulting from lost trips due to waiting for the passenger) and/or whether the passenger has reserved the vehicle for a particular level of service as discussed further below.

For instance, the hierarchy of preferences may be adjusted or a different hierarchy of preferences may be used depending upon the level of service. In other words, the aforementioned hierarchy of preferences may be a "default" hierarchy of preferences for a default level of service. If a passenger chooses to opt for a higher level of service the fleet management system 410 may optimize for the vehicle to be available by when the passenger is actually ready to be picked up. For instance, the hierarchy of preferences may be changed from the default in various ways such as not allowing the fleet management system 410 to assign long duration trips, decreasing the period defining short duration trips or not allowing the fleet management system 410 to assign short duration trips at all, increasing the aforementioned buffer for short duration trips, causing the vehicle to park closer to the location of the intermediate destination (even when this requires payment or additional fees to park), etc.

Once the passenger is ready to be picked up at the intermediate destination, he or she may use her client computing device to "recall" the vehicle. This may include tapping a button or otherwise selecting an option in the application using the passenger's client computing device which causes the client computing device to send a request to the fleet management system 410 to recall the vehicle. In response, if the vehicle 100 is available (i.e. not getting maintenance or servicing a trip), the fleet management system 410 may send instruction to the vehicle, for instance via network 460, to return to the intermediate destination, pick up the passenger, and complete the trip. This may include stopping at additional intermediate destinations as well as transporting the passenger to the final destination. If the vehicle 100 is not available, the fleet management system 410 may estimate a period of time for the vehicle to reach the intermediate destination. If this period of time is less than a threshold period of time, for instance 10 minutes or more or less (which of course, may be adjusted downward depending upon the level of service), the fleet management system 410 may provide the passenger with options for waiting getting another vehicle, for instance via the application on the passenger's client computing device.

In some instance, the passenger may have left articles in the vehicle. If so, the passenger may be given an option in the application via the passenger's client computing device to have those articles delivered to the passenger at a particular location within a service area of the vehicle sometime later. Of course, there may be limits on this, such as a reasonable time length at which point the goods may be delivered or deposited to a predetermined location, such as the passenger's home, the passenger's work, a location also managed by or affiliated with the service (i.e. a vehicle depot, a coffee shop or restaurant affiliated with the service, or other such location) convenient for the passenger, a physical locker at a particular location, or some other reasonable location. The delivery may be accomplished by requiring the passenger (or rather the passenger's client computing device) to authenticate to the vehicle, speak and/or be viewed by a remote customer service agent, etc. before allowing the passenger access to the articles to protect the passenger's articles from theft. In addition, to facilitate the ability for a passenger to leave articles in a vehicle safely while the passenger is at an intermediate destination, the vehicle may include lockable compartments to safely store articles.

Although the examples above suggest determining an amount of waiting time may occur once per trip or per intermediate destination, the amount of waiting time may actually be updated. These updates may be periodic, for instance every minute or more or less, or any time that circumstances may indicate that the amount of waiting time has changed. For instance, as noted above, if a passenger modifies, such as by increasing or decreasing, an expected amount of waiting time, for example using an option in the application on his or her client computing device, the amount of waiting time may be updated or recalculated using any of the factors described above.

In some instances, the intermediate destination may be a pick up location that occurs before the passenger who scheduled the trip. In this regard, the intermediate destination may involve picking up a third party to ride with the passenger when the passenger is not in the vehicle. In order to ensure that the correct third party enters the vehicle (or places cargo in the vehicle), the fleet management system 410 may also be able to implement authentication using a token (for instance, over text message or email to the third party once identified by the passenger), using ultrasound (whisper net), confirming the third party with a camera image or video image of the third party sent to the passenger, a call to customer service, etc.

Figure 11:
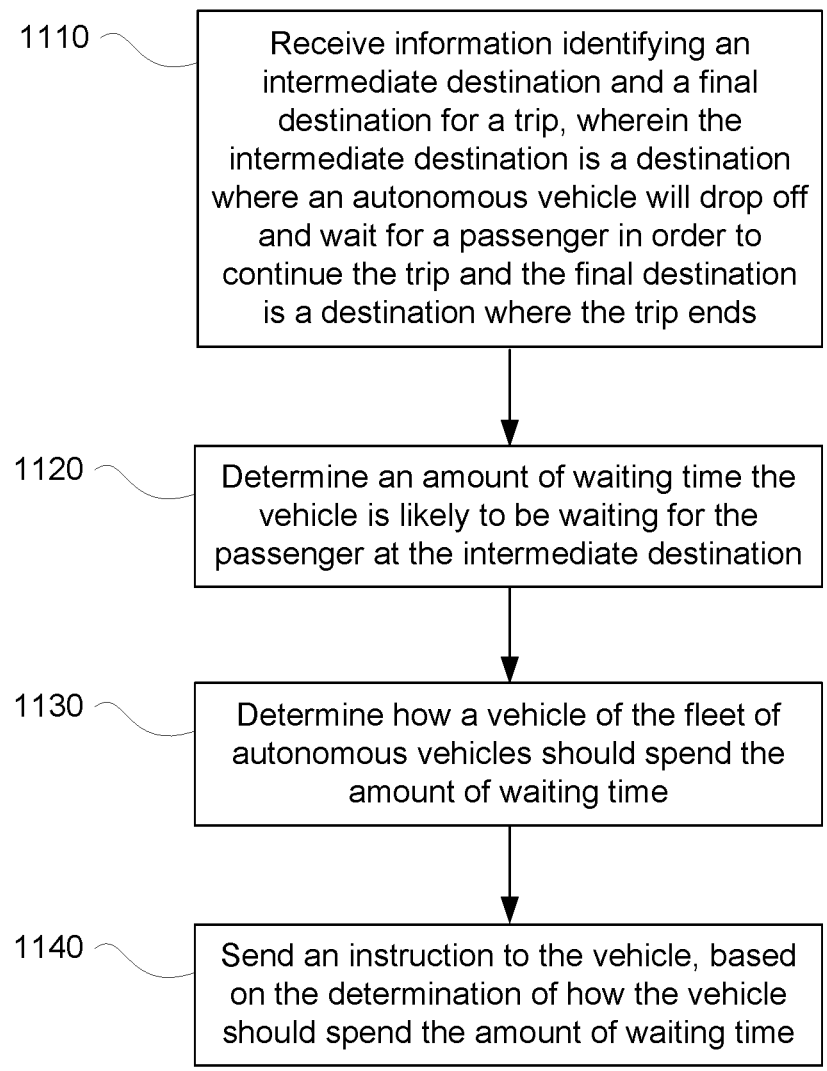
FIG. 11 is an example flow diagram in accordance with aspects of the disclosure.

FIG. 11 includes an example flow diagram 1100 of some of the examples for managing a fleet of autonomous vehicles providing trip service as discussed above. In this example, the steps of flow diagram may be performed by one or more processors of one or more computing devices, such as processors of the server computing devices of the fleet management system 410. At block 1110, information identifying an intermediate destination and a final destination for a trip is identified. In this example, the intermediate destination is a destination where an autonomous vehicle will drop off and wait for the passenger in order to continue the trip, and the final destination is a destination where the vehicle will drop off the passenger and the trip ends. At block 1120, how long the vehicle is likely to be waiting for the passenger at the intermediate destination is determined. At block 1130, how a vehicle of the fleet of autonomous vehicles should spend the determined amount of time is determined. An instruction is sent to the vehicle based on the determination of how the vehicle should spend that amount of time at block 1140.

The features described here allow an autonomous vehicle service to accommodate trips with multiple destinations. In addition, the fleet management system is able to determine what a vehicle should do while waiting for a passenger at an intermediate destination in a way which allows the fleet management system to reduce the amount of time that a vehicle is spent waiting in an unproductive way. In addition, as noted above, what the vehicle does may be selected in order to optimize the number of trips serviced while a vehicle would otherwise be waiting and/or for the vehicle to be able to immediately return to pick up a passenger at an intermediate destination when the passenger is ready to be picked up. In addition, the features described herein allow a passenger to act as a pseudo dispatcher for a vehicle which they may not own, but can be used to pick up and drop of the passenger and/or third parties at the passenger's discretion, without having to worry about a driver or what the vehicle will do when the passenger is at an intermediate destination. Moreover the features described herein may allow for various ownership models which can allow a passenger to effectively take a vehicle in an out of service based on how long a passenger will not require the vehicle (i.e. how long the passenger will be at the intermediate destination).

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling an autonomous vehicle, the method comprising:
   controlling, by one or more processors, the autonomous vehicle to drop off a passenger at an intermediate destination location during a trip to a final destination;
   obtaining, by the one or more processors, information associated with traffic congestion in a vicinity of the intermediate destination location;
   determining, by the one or more processors based on the information associated with the traffic congestion in the vicinity of the intermediate destination location, whether the autonomous vehicle should leave the intermediate destination location to perform a task;
   in response to determining that the autonomous vehicle should leave the intermediate destination location to perform the task, controlling, by the one or more processors, the autonomous vehicle to leave the intermediate destination location to perform the task; and
   in response to determining that the autonomous vehicle should not leave the intermediate destination location to perform the task, controlling, by the one or more processors, the autonomous vehicle to remain at the intermediate destination location to wait for the passenger to continue the trip.

2. The method of claim 1, wherein the task is to maneuver the autonomous vehicle to a maintenance location.

3. The method of claim 2, wherein the maintenance location is a location where the autonomous vehicle can be charged.

4. The method of claim 2, wherein the maintenance location is a location where the autonomous vehicle can be cleaned.

5. The method of claim 1, wherein the task is to maneuver the autonomous vehicle to pick up another passenger.

6. The method of claim 1, wherein the task is to maneuver the autonomous vehicle to at least one of pick up or deliver cargo.

7. The method of claim 6, wherein the cargo includes dry cleaning.

8. The method of claim 6, wherein the cargo includes coffee.

9. The method of claim 1, wherein the one or more processors are comprised by the autonomous vehicle.

10. The method of claim 1, wherein the one or more processors are comprised by a fleet management system.

11. The method of claim 1, wherein the information is received from one or more server computing devices via a network.

12. The method of claim 1, wherein the information is received from a camera or video feeds.

13. A system for controlling an autonomous vehicle, the system comprising one or more processors configured to:
   control the autonomous vehicle to drop off a passenger at an intermediate destination location during a trip to a final destination;
   obtain information associated with traffic congestion in a vicinity of the intermediate destination location;
   determine, based on the information associated with the traffic congestion in the vicinity of the intermediate destination location, whether the autonomous vehicle should leave the intermediate destination location to perform a task;
   in response to determining that the autonomous vehicle should leave the intermediate destination location to perform the task, control the autonomous vehicle to leave the intermediate destination location to perform the task; and
   in response to determining that the autonomous vehicle should not leave the intermediate destination location to perform the task, control the autonomous vehicle to remain at the intermediate destination location to wait for the passenger to continue the trip.

14. The system of claim 13, wherein the information is received from one or more server computing devices via a network.

15. The system of claim 13, wherein the information is received from a camera or video feeds.

16. The system of claim 13, wherein the task is to maneuver the autonomous vehicle to a maintenance location.

17. The system of claim 16, wherein the maintenance location is a location where the autonomous vehicle can be charged.

18. The system of claim 16, wherein the maintenance location is a location where the autonomous vehicle can be cleaned.

19. The system of claim 13, wherein the task is to maneuver the autonomous vehicle to at least one of pick up or deliver cargo.

20. The system of claim 19, wherein the cargo includes at least one of dry cleaning or coffee.

* * * * *